N. H. Borgfeldt's Imp-t in Cigar Moulds.

No. 109490  
Patented Nov 22 1870

Witnesses:
C. Wahlers
E. F. Kastenhuber

Inventor:
Nicholas H. Borgfeldt
pr
Van Santvoord & Hauff
atty

United States Patent Office.

NICHOLAS H. BORGFELDT, OF NEW YORK, N. Y.

Letters Patent No. 109,490, dated November 22, 1870.

IMPROVEMENT IN CIGAR-MOLDS.

The Schedule referred to in these Letters Patent and making part of the same.

*To all whom it may concern:*

Be it known that I, NICHOLAS H. BORGFELDT, of the city, county, and State of New York, have invented a new and useful Improvement in Cigar-Molds; and I do hereby declare the following to be a full, clear, and exact description thereof, which will enable those skilled in the art to make and use the same, reference being had to the accompanying drawing forming part of this specification, in which drawing—

Similar letters indicate corresponding parts.

Figure 1:
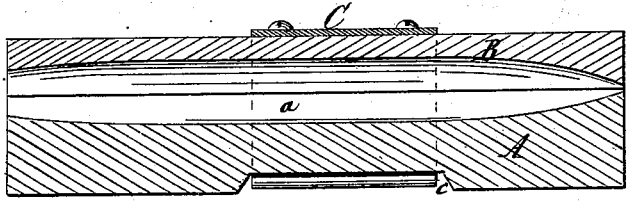
Figure 1 represents a longitudinal vertical section of this invention.

This invention consists in the arrangement of a spring-clamp attached to the follower of a cigar-mold, and fitting closely to the sides of the mold in such a manner that, when the follower is forced down on the cigar or filler contained in the mold, the bottom ends of the clamp will catch under the edges of the mold and retain the follower in position, and, at the same time, by said clamp, the sides of the mold are braced and prevented from bulging out, or from giving way under the pressure to which the same is exposed.

In the drawing—

The letter A designates a cigar-mold, which is made of wood, and provided with a cavity, *a*, corresponding in form to that of the cigars to be produced.

Figure 2:
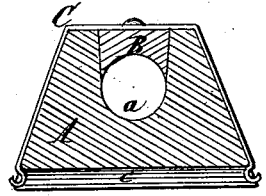
Figure 2 is a transverse section of the same.
Figure 3:
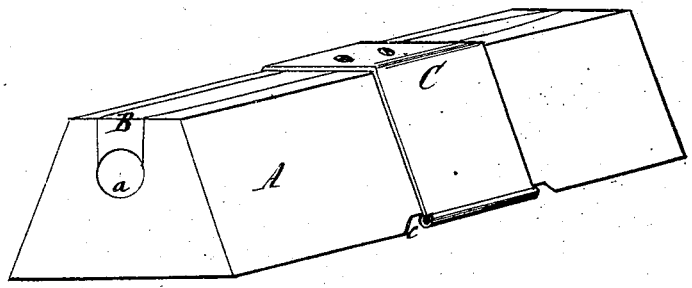
Figure 3 is a perspective view of the same.

To the outer flat surface of this follower is secured a spring-clamp, C, made of sheet metal of sufficient strength, and so formed that, when the follower is pressed down into the mold, said clamp will closely fit to the sides thereof, as shown in figs. 2 and 3.

The bottom ends of said clamp are provided with snaps, *b*, capable of catching under the bottom edges of the mold or under the edges of a cavity, *c*, made in the bottom of said mold to admit the snaps *b*.

In using my mold, I place the cigar or the filler into the mold, and then I press down the follower until the clamp catches under the bottom edges of said mold, thereby retaining the follower firmly in position.

By the action of the clamp, therefore, the cigar or filler can be kept in a compressed state until it becomes dry, and at the same time the sides of the mold are braced and enabled to withstand the outward pressure to which they are exposed.

By this arrangement the operation of pressing or molding cigars is materially facilitated, no press is required to keep the molds under pressure, and the operation of introducing and removing the fillers or cigars to be pressed can be effected with great rapidity.

What I claim as new, and desire to secure by Letters Patent, is—

The spring-clamp C, in combination with the follower B and mold A, constructed and operating substantially in the manner shown and described.

NICHOLAS H. BORGFELDT.

Witnesses:
W. HAUFF,
C. WAHLERS.